US012763533B2

(12) United States Patent
McCormack

(10) Patent No.: US 12,763,533 B2
(45) Date of Patent: Oct. 13, 2026

(54) THREE DIMENSIONAL OFFSET RIGHT-ANGLE 1/4-INCH AUDIO PLUG

(71) Applicant: Brendan McCormack, Lisle, IL (US)

(72) Inventor: Brendan McCormack, Lisle, IL (US)

( * ) Notice: Subject to any disclaimer, the term of this patent is extended or adjusted under 35 U.S.C. 154(b) by 323 days.

(21) Appl. No.: 18/197,712

(22) Filed: May 15, 2023

(65) Prior Publication Data

US 2024/0388047 A1 Nov. 21, 2024

(51) Int. Cl.

*H01R 24/54* (2011.01)
*H01R 24/52* (2011.01)
*H01R 24/58* (2011.01)
*H01R 103/00* (2006.01)

(52) U.S. Cl.

CPC .......... *H01R 24/545* (2013.01); *H01R 24/52* (2013.01); *H01R 24/58* (2013.01); *H01R 2103/00* (2013.01)

(58) Field of Classification Search

CPC .............................. H01R 24/545; H01R 24/52
USPC .......................................................... 439/669
See application file for complete search history.

(56) References Cited

U.S. PATENT DOCUMENTS 5,419,707 A * 5/1995 Kelley .................. H01R 31/00 439/21
8,162,697 B1 * 4/2012 Menolotto ......... H01R 13/7031 439/669
2012/0094521 A1 * 4/2012 Montena ............. H01R 13/639 439/345

* cited by examiner

*Primary Examiner* — Tulsidas C Patel
*Assistant Examiner* — Thaslimur Rahman
(74) *Attorney, Agent, or Firm* — GrowIP Law Group LLC

(57) ABSTRACT

Common ¼-inch audio plugs include straight and right-angle orientations. Neither type is best suited for use with Fender Stratocaster-style guitars, whose output jacks are not surface-mounted but recessed into the body of the instrument. This invention modifies the design of the right-angle plug such that its shape reconciles the contours of Stratocaster-style jack plates with the aesthetic and practical needs of Stratocaster players. This modification occurs by introducing a new angle into the body segment of a right-angle plug, thereby creating two body segments. The proximal body segment (the one closer to the plug's shaft) serves to extend the plug from the recessed jack to the surface of the instrument. The new angle serves to orient the distal body segment (the one closer to the plug's cable) such that it, and the cable protruding therefrom, run exactly or approximately parallel to the surface of the instrument.

6 Claims, 17 Drawing Sheets

THREE DIMENSIONAL OFFSET RIGHT-ANGLE 1/4-INCH AUDIO PLUG

BACKGROUND OF THE INVENTION

The invention relates to a ¼-inch audio plug for connecting music and audio equipment.

In the industry, these plugs are commonly called ¼-inch TS or TRS plugs, depending on whether they have two conductors (Tip, Sleeve) or three (Tip, Ring, Sleeve). The shaft of the plug is a cylinder with a ¼-inch diameter. This design is the standard for connecting electric guitars to amplifiers or to other audio equipment, though they can connect audio equipment regardless of whether a guitar is involved.

There are currently two common types of plug orientations: straight and right-angle. The shaft of a straight plug is in-line and coaxial with its cable. It is useful to consider a straight plug to be one-dimensional because the cable and the plug's shaft extend along only one axis. The shaft of a right-angle plug is perpendicular to its cable. On a right-angle plug, the cable and the shaft share a geometric plane. It is useful to consider a right-angle plug to be two-dimensional because the axis of the cable and the axis of the plug's shaft—orthogonal as they are—neatly construct a two-dimensional plane.

The male part of the connection is called a 'plug' and the female part is called a 'jack.' Most audio devices that accept ¼-inch plugs have their ¼-inch jacks mounted on the surface of the device such that, when plugged in, the plug's body is perpendicular to the surface. Let these jacks be called 'standard' jacks.

When a straight plug is plugged into a standard jack, its cable protrudes some significant distance from the audio device. Users wanting to reduce this distance can use a right-angle plug, which allows the cable to 'hug' the side of the device and run parallel to it, thus preventing the cable from protruding as far as it would with a straight plug. The feature of preventing cable protrusion is useful wherever neatness or conserving space are priorities or requirements of the user. Additionally, in certain applications, the protruding body and cable of a straight plug can hazard a longer mechanical lever with which to accidentally apply destructive force to the plug/jack connection.

One type of music equipment that does not use a standard jack, however, is the style of electric guitar exemplified by the Fender Stratocaster ('Strat' from here). On Strat-style guitars, the metal plate that fastens the jack to the body of the instrument reorients the jack in such a way that an inserted plug is not perpendicular to the surface. Rather, it is recessed on a non-perpendicular angle to the body of the instrument.

When playing many types of electric guitar, users will commonly route their cable through the gap between the guitar's strap and its body ('strap gap' from here) before plugging it into the guitar's output jack. Doing this adds a measure of strain relief to the guitarist's setup. If excess strain is accidentally applied to the cable, the strain is transferred to the strap gap, rather . . . than applied directly to the delicate electrical plug/jack connection.

On guitars possessing a standard output jack, a right-angle plug allows the cable to hug and run parallel—to the surface of the guitar between the jack and the strap. On Strat-style guitars, the recessed-angle output jack plate nullifies a right-angle plug's ability to make its cable lay flat against the guitar's surface. This nullification occurs because the recession of the jack into the body of the guitar prevents the plug's body from rotating, around the shaft's axis, into a position where the cable becomes parallel to the surface of the guitar.

The output jack on a Strat-style guitar directs the cable of a straight plug to drape downward toward the floor. The strap gap is upward from the output jack. Therefore, the cable must reverse direction from 1) the downward direction required by the output jack to 2) the upward direction required by the strap gap. This change in direction creates an arc of cable as the cable loops from the output jack to the strap gap. Using a right-angle plug creates a smaller arc of cable between the output jack and the strap gap than the cable arc created from using a straight plug. The difference between arc sizes is significant enough that some players of Strat-style guitars opt for the right-angle plugs despite these plugs' inability to lay the cable fully or mostly flat against the guitar. This configuration is used by such guitarists as Instagram user @PedroMakesMusic, who sometimes plays a Strat-style guitar connected by a right-angle plug.

To summarize the problem, the cables of neither straight nor right-angle plugs can lay fully flat against or parallel to the surface of Strat-style guitars. Previous attempts to solve this problem are identifiably two-fold. The first is best exemplified by the Alex Lifeson signature Fender Stratocaster, though other guitarists have copied this solution. This guitar model inverts the recessed output jack plate so that it is positioned in a convex orientation rather than the standard concave orientation. This way, a standard right-angle plug will lay relatively flat and parallel to the instrument, because the output jack then protrudes from the guitar—rather than intruding into it—and a right-angle plug can then rotate, around the axis of its shaft, into a position allowing the cable to lay flat against or parallel to the surface of the guitar.

The second attempt is to replace the idiosyncratic Strat-style recessed output jack plate with a flat plate, giving the guitar that which was defined supra as a 'standard jack,' which can be perfectly serviced by a standard right-angle plug.

Let these two solutions be called 'jack-based' solutions because they attempt to solve the problem at hand by modifying the jack plate. Additionally, let this invention, which solves the problem by modifying the plug, rather than the jack plate, be called a 'plug-based' solution. The importance of having a plug-based solution is crucial because guitars—especially vintage guitars—lose value when their stock appearance is changed. Inverting the Strat-style jack plate or replacing it with a flat jack plate are both examples of modifications that change the stock appearance of their guitars. Additionally, many newer, non-vintage guitars aspire to look like older instruments, so these jack-based solutions are not ideal.

Having the cable of a Strat-style guitar lay flat against the surface of the instrument is aesthetically pleasing, much like tailored clothes are often more aesthetically pleasing than off-the-rack clothes. However, in addition to these aesthetic benefits, the lower profile offered by this configuration provides at least four practical benefits, which demonstrate the utility of the invention.

The first practical benefit of a lower-profile cable is a reduction of the amount (length) of cable sacrificed by the cable arc when looping the cable through the strap (see supra). In turn, more of the guitarist's cable can be used to extend the useable length of the cable, and therefore increase the distance the guitarist can stand away from the amplifier or other audio equipment to which the other end of the cable is attached.

The second practical benefit of a lower-profile cable is a reduction of strain, when looped through the strap gap (see supra), on the cable because it is not being subject to a tight-radius arc. The life of the cable is thereby prolonged.

The third practical benefit of a lower-profile cable relates to the part of the guitar called the "tremolo arm" or "whammy bar." This part is an L-shaped lever that screws into the bridge of the guitar via male threads on the short side of the tremolo arm and female threads in the bridge. To install the tremolo arm, the longer dimension of the tremolo arm's L-shape (the "arm" of the tremolo arm) rotates around the axis of the shorter dimension (the "axis" of the tremolo arm) until the tremolo arm is sufficiently screwed into the bridge. Straight and right-angle plugs protrude enough that, if the guitar is already plugged in with one of these two types of plugs, the tremolo arm cannot rotate fully around the installation axis because the arm's rotational path is obstructed by the protruding plug. With the lower profile offered by this invention, the arm can rotate fully around its axis without the plug obstructing its path. What this benefit means in plain terms is that a guitarist can install the tremolo arm after the guitar is plugged in (for example, in the middle of a performance), without having to unplug the guitar first. Unplugging a guitar usually means the amplifier—to which it ultimately connects must be powered off first, to avoid loud popping noises caused by the electrical contacts of the plug contacting the incorrect electrical contacts of the jack as the plug is removed. With this invention a guitarist would not have turn off the amplifier and unplug the guitar just to be able to install the tremolo arm; he could install it while the guitar was plugged in.

The fourth practical benefit of a lower-profile cable also relates to the guitar's tremolo arm. For most right-handed guitarists, the tremolo arm is oriented in a useful position when the arm is approximately between 3:00 and 6:00, with 12:00 being the upward direction. There are two ways the arm can arrive at that position. First, the arm can be screwed in sufficiently that the tightness of the screw keeps the arm in position without any additional assistance. Second, the arm can be left slightly unscrewed so that the looseness of the screw causes the arm to dangle at approximately the 6:00 position due to gravity. Then, the player can manually retrieve the arm to a useful position, use it as needed, and then release it back to dangle in the 6:00 position. In this second case, when the guitarist releases the tremolo arm, it does not just swing down to the 6:00 position; it swings past the 6:00 position and then returns to the 6:00 position. If a straight or right-angle plug is being used, the arm will hit the plug as it swings down past the 6:00 position. With this invention, as described supra, the arm will pass over the plug due to its low profile. That the arm avoids the plug is critical because repeated instances of the tremolo arm striking the plug with the force of gravity can lead to a gradual destruction or disassembly of the plug and/or jack.

There are two instances of prior art that ought to be addressed to dismiss them as potential conflicts with respect to this invention's novelty, both of which offer plug-based solutions either to Strat-style guitars specifically, or audio connectivity generally. The first of these plug-based solutions refers to U.S. Pat. No. 10,411,418 B2, an audio plug invention sold currently on the market under the trademark "Rockboard." What the Rockboard invention has in common with this invention is that they both introduce obtuse angles between the cable and the shaft of the plug. However, there are two reasons why the Rockboard plug should not be understood as prior art that would disqualify the novelty of this invention.

First, according to Paragraph 2 of that patent's Brief Summary of the Invention, "[o]ne core concept of the invention lies in configuring the plug device in such a way that [the angle of the cable to the plug shaft] can be adjusted depending on the desired cable routing" (italics added for emphasis and bracketed parenthetical added to disambiguate the original text's pronoun "it"). Adjustability of the cable-shaft angle, while integral to the utility and novelty of the Rockboard plug, is completely irrelevant to this invention.

And second, the novel obtuse angles made possible by the Rockboard plug's angle-adjustability are still contained in the two-dimensional geometric plane created by the coincidence of the axes of the cable and plug shaft. The novel obtuse angle introduced by this invention is not on the two-dimensional plane that would ordinarily exist for right-angle plugs. Instead, this invention's novel obtuse angle causes the cable to protrude from that two-dimensional plane into a third geometric dimension. This protrusion into a third dimension exemplifies the core feature of the invention.

This paragraph contrasts from this invention the second instance of prior art introduced supra. Though information to identify a patent for this prior art was not easily obtainable, the product manufactured ostensibly under its protections can be identified generally by the manufacturer Neutrik, which makes many different audio and other plugs, and specifically by the model number NP2HXA. Marketing literature for this product described the plug in the following way: "With its revolutionary new 30° angled housing, this plug provides an extraordinary stress-free cable release and is the perfect choice for various applications like mixing desks and applications with limited space, e.g. the backside of racks, as well as guitars (especially the Fender Stratocaster)." The 30-degree angle is better expressed as its supplement, 150 degrees, to ensure proper comparison to straight, right-angle, and Rockboard plugs.

As with the novel angles introduced by the Rockboard plug, the novel angle introduced by the Neutrik NP2HXA is contained within the two-dimensional plane created by the coincidence of the axis of the cable and the axis of the plug shaft. And though Neutrik names the Fender Stratocaster as a guitar especially well-serviced by their NP2HXA, its two-dimensional geometry causes it not to address the problems with Strat-style guitars addressed by this invention, outlined in the Brief Summary of the Invention and Detailed Description of the Invention.

BRIEF SUMMARY OF THE INVENTION

This invention introduces an angle in the body of a right-angle plug. The effect of this new angle is that it allows the plug, when inserted into the output jack of a Strat-style guitar, to be rotated around the axis of the plug's shaft to a position where the cable protruding from the plug becomes parallel to the surface of the guitar.

DETAILED DESCRIPTION OF THE INVENTION

Figure 1:
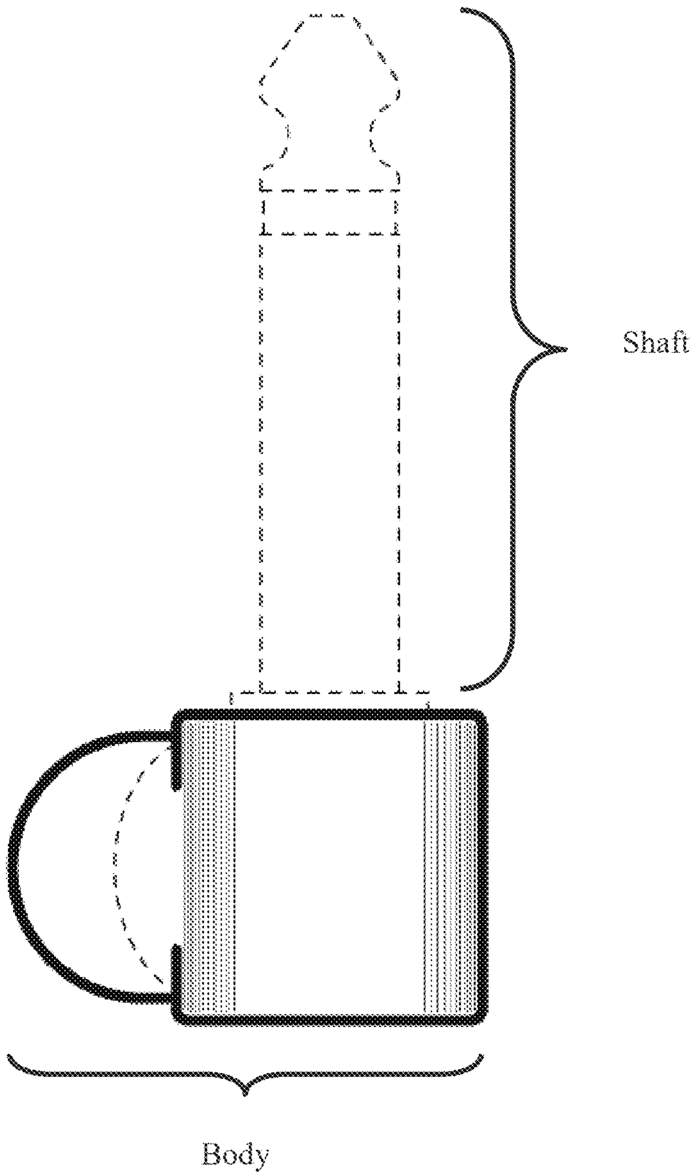
FIG. 1 is a top view of an ¼-inch phono audio plug exemplifying the right-handed version of the invention.
Figure 2:
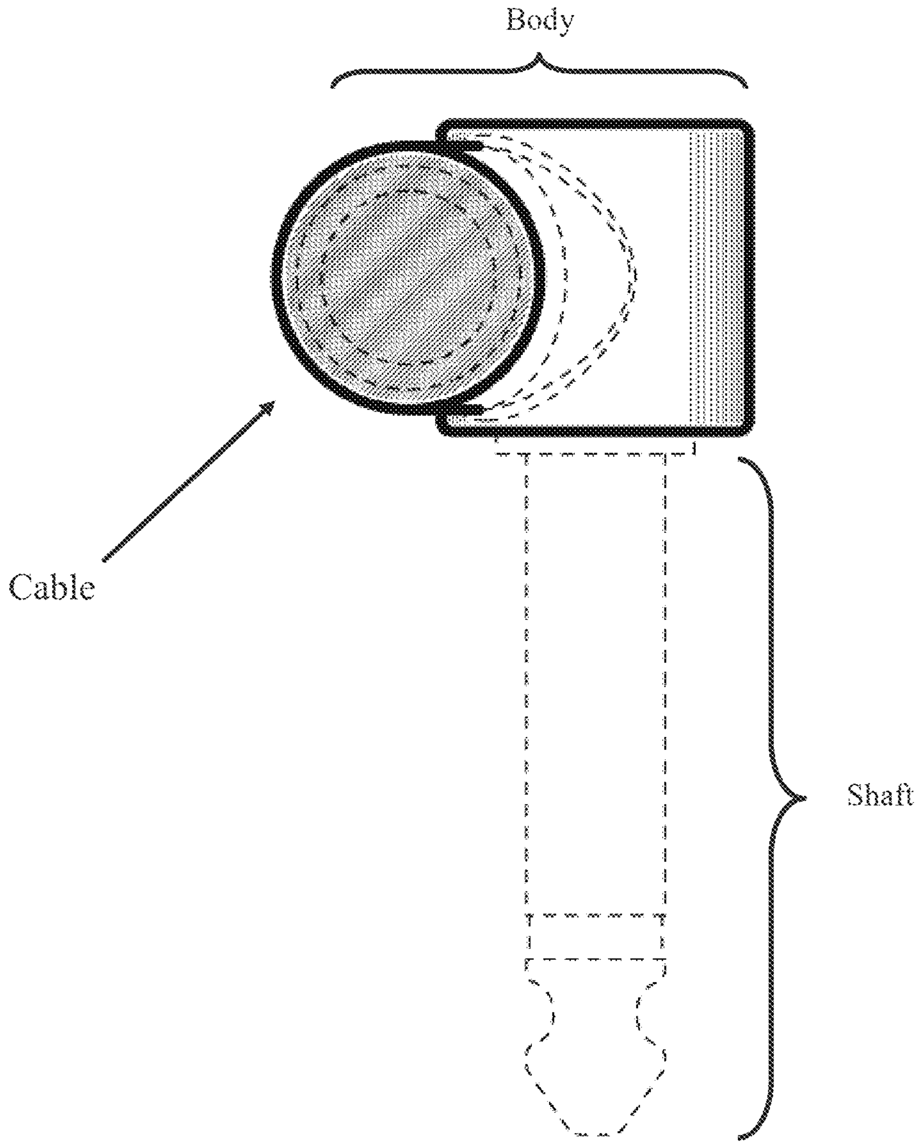
FIG. 2 is a bottom view thereof.
Figure 3:
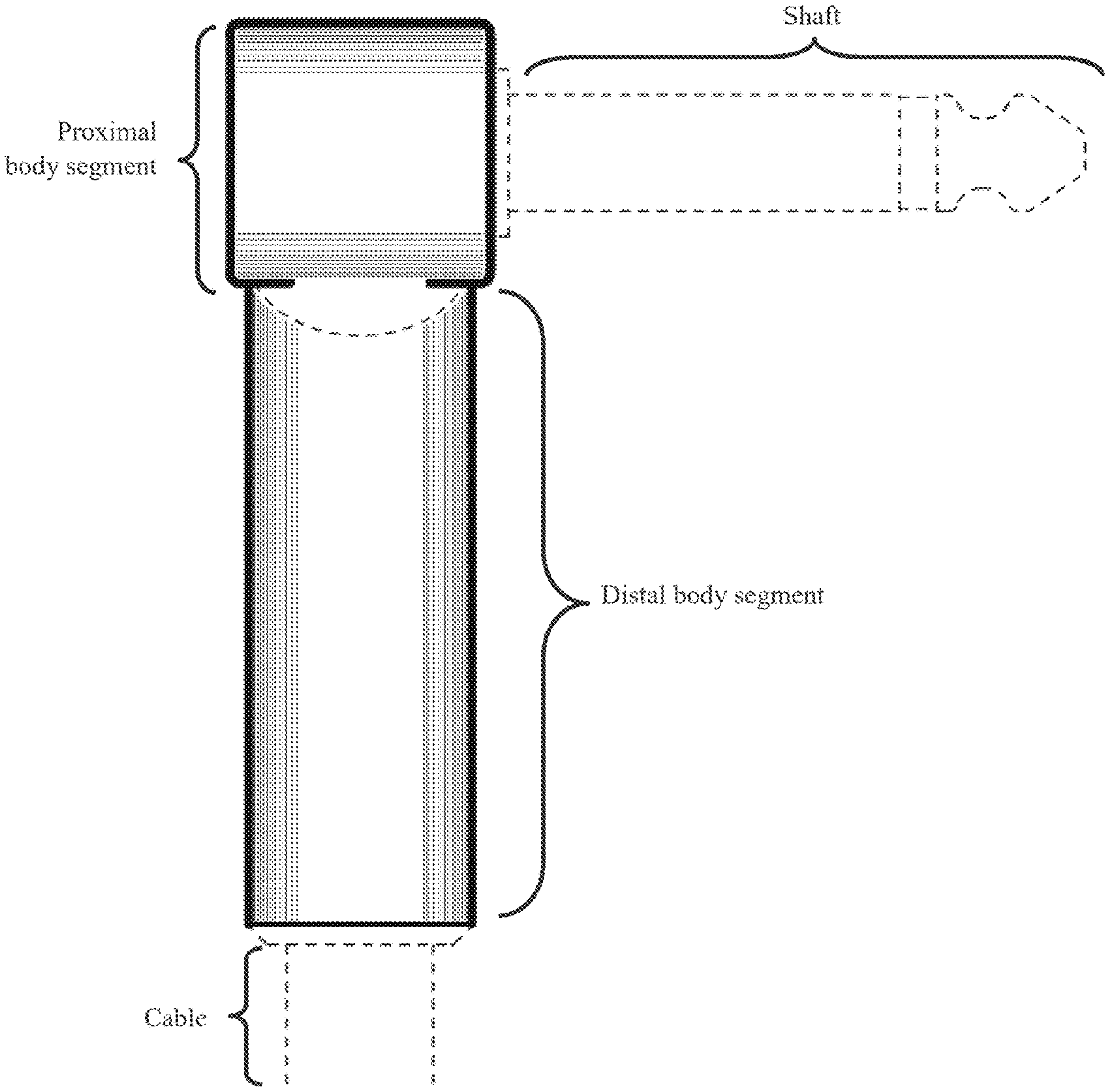
FIG. 3 is a left-side view thereof.
Figure 4:
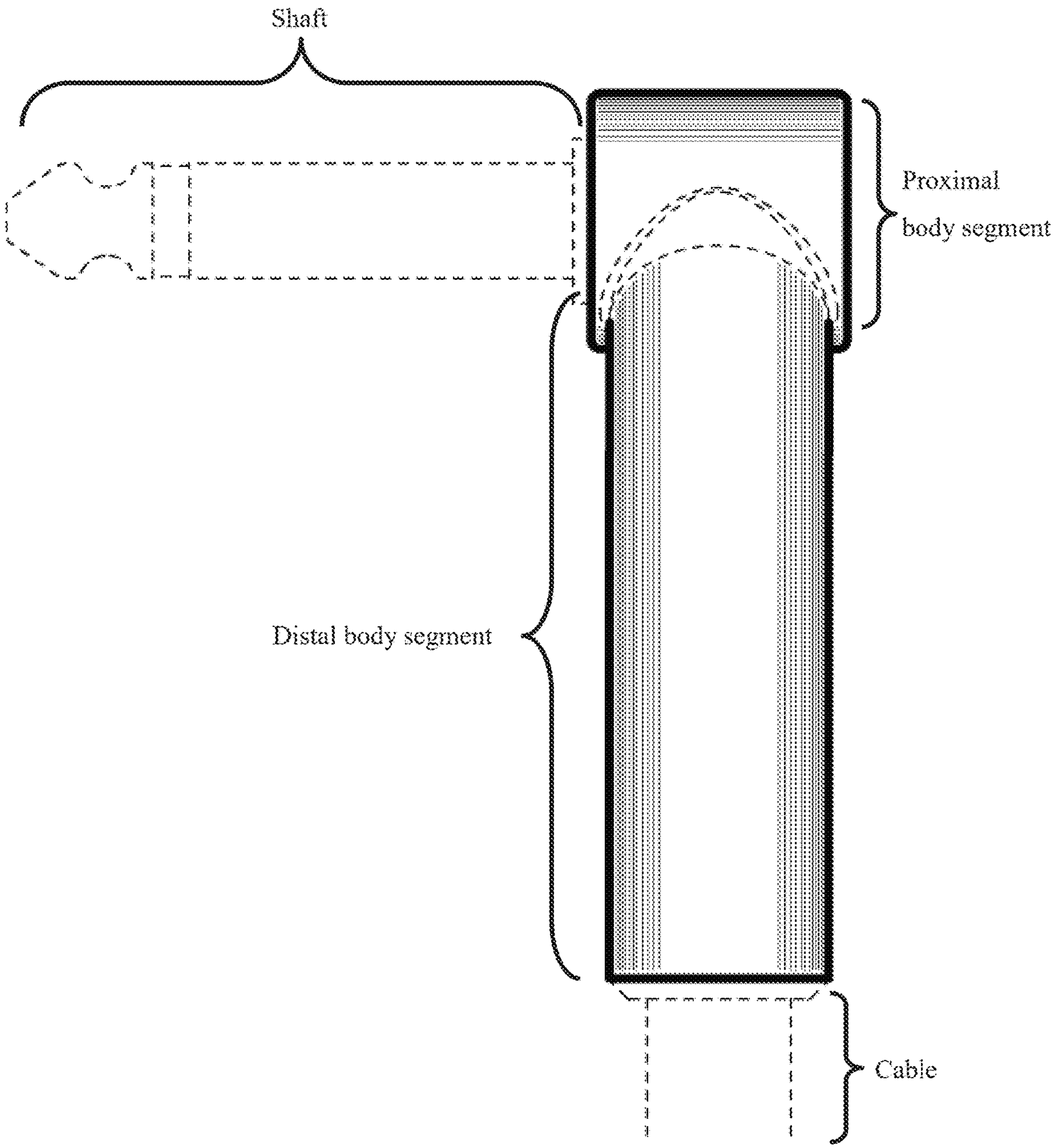
FIG. 4 is a right-side view thereof.
Figure 5:
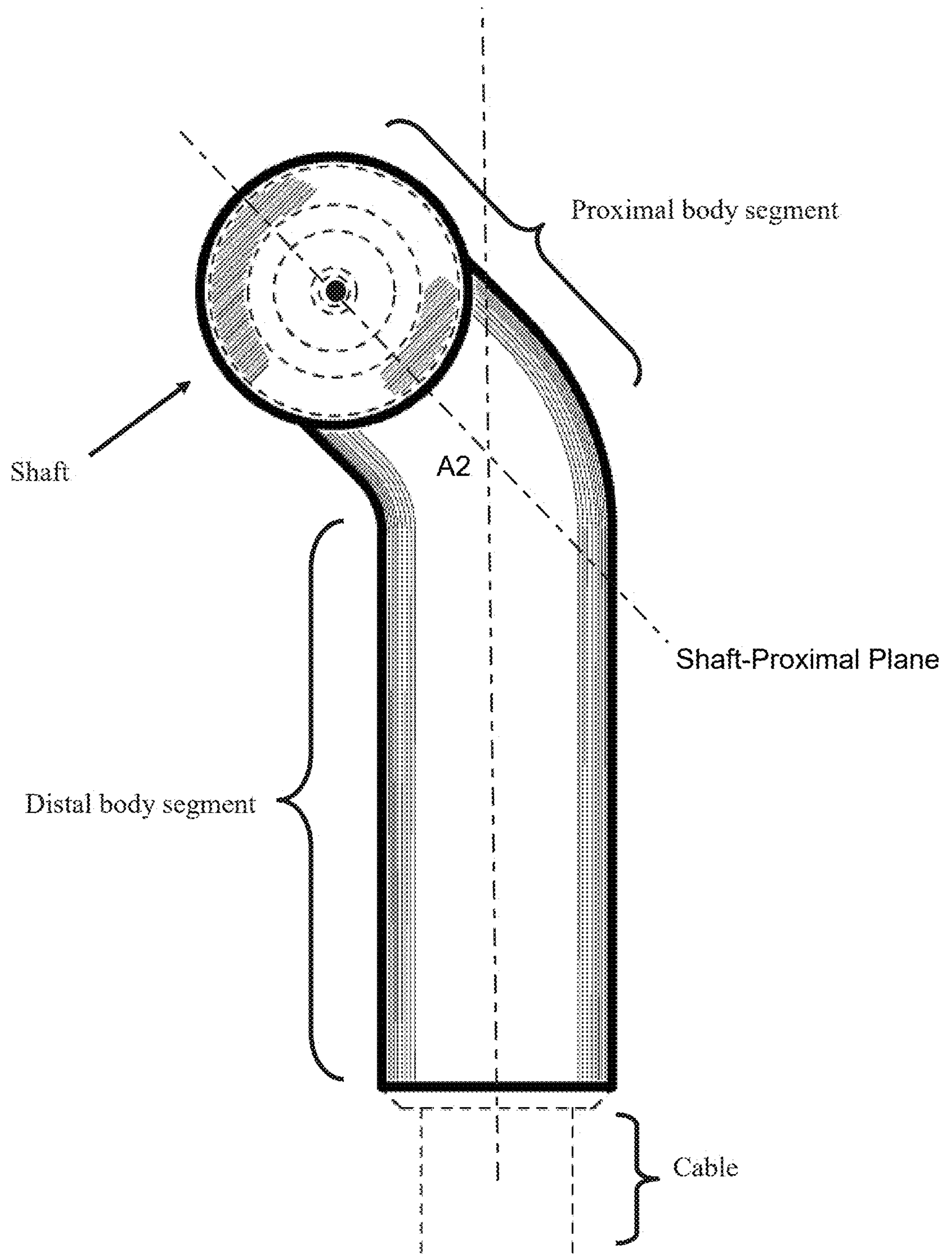
FIG. 5 is a front view thereof.
Figure 6:
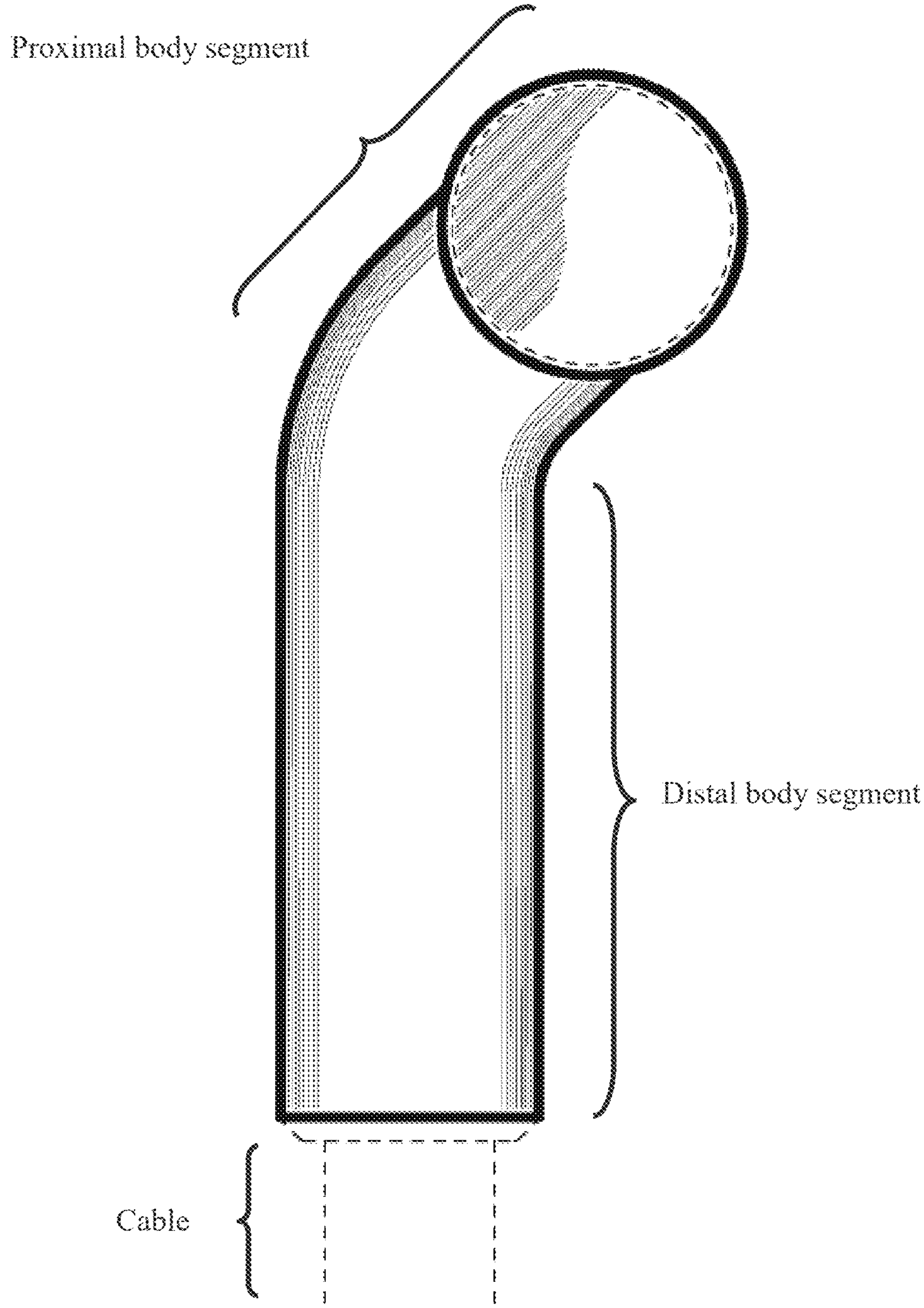
FIG. 6 is a rear view thereof.
Figure 7:
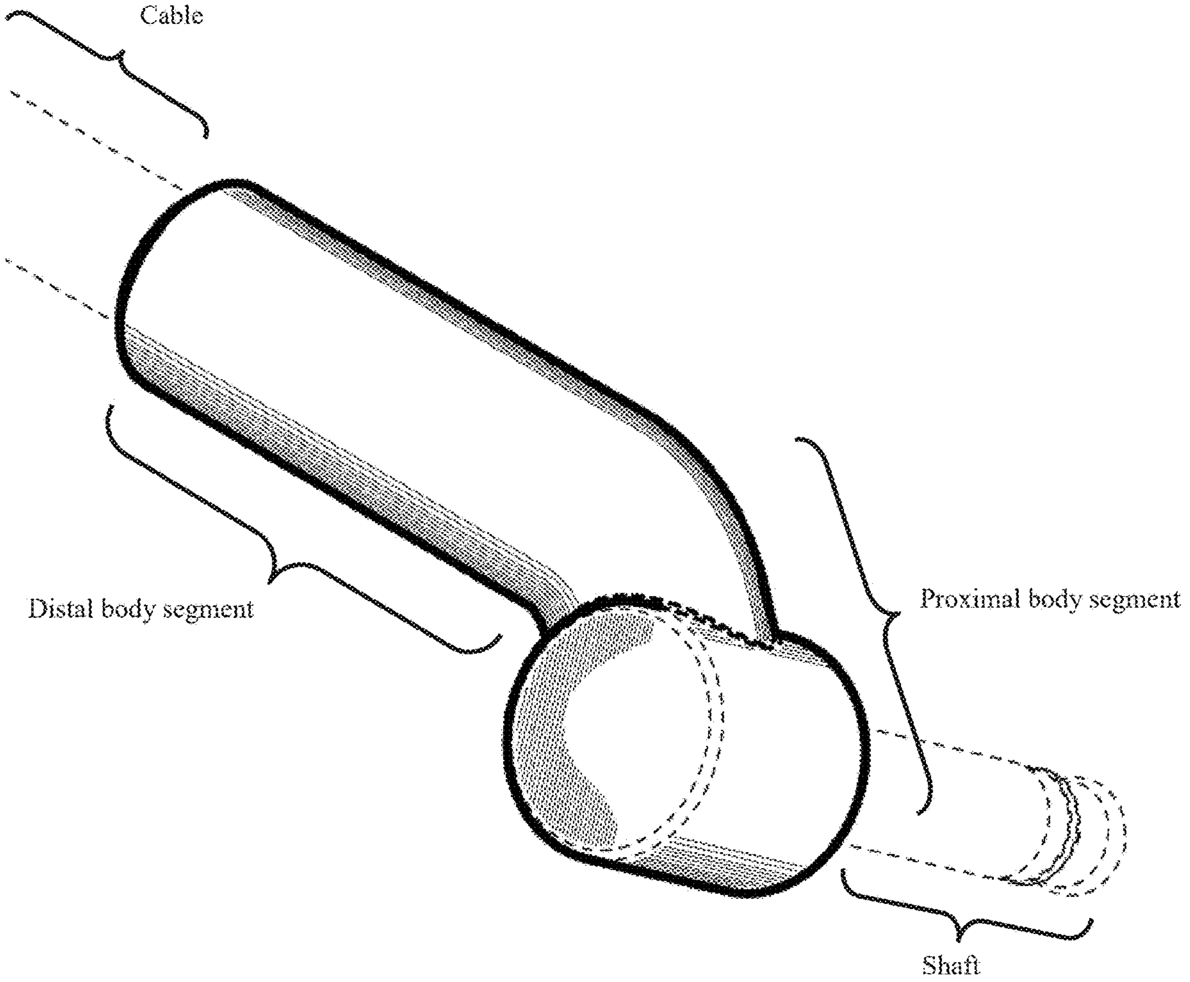
FIG. 7 is a perspective view thereof.
Figure 8:
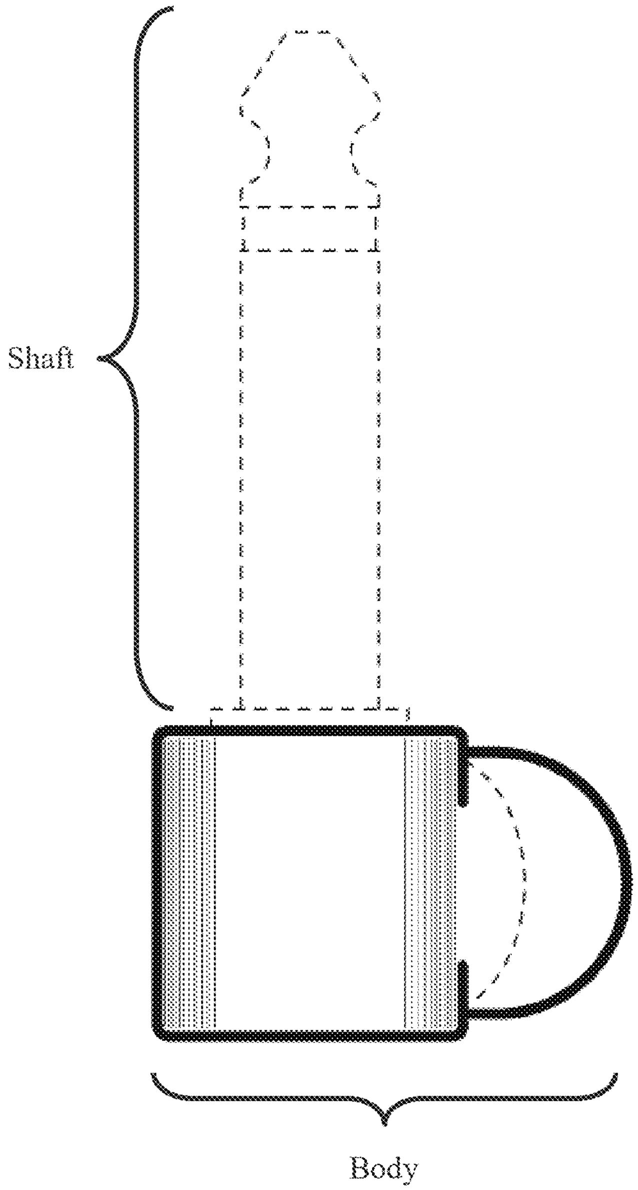
FIG. 8 is a top view of a ¼-inch phono audio plug exemplifying the left-handed version of the invention.
Figure 9:
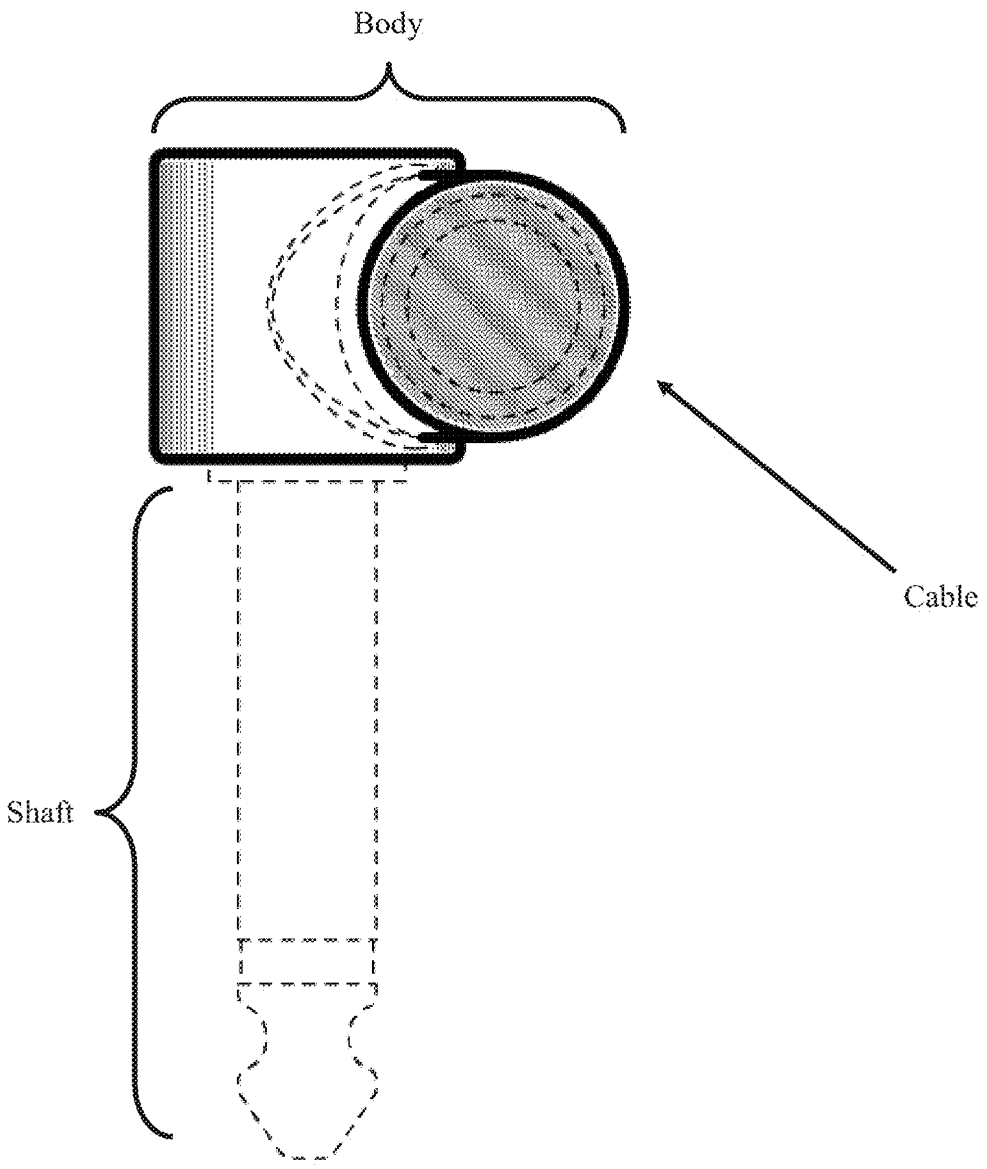
FIG. 9 is a bottom view thereof.
Figure 10:
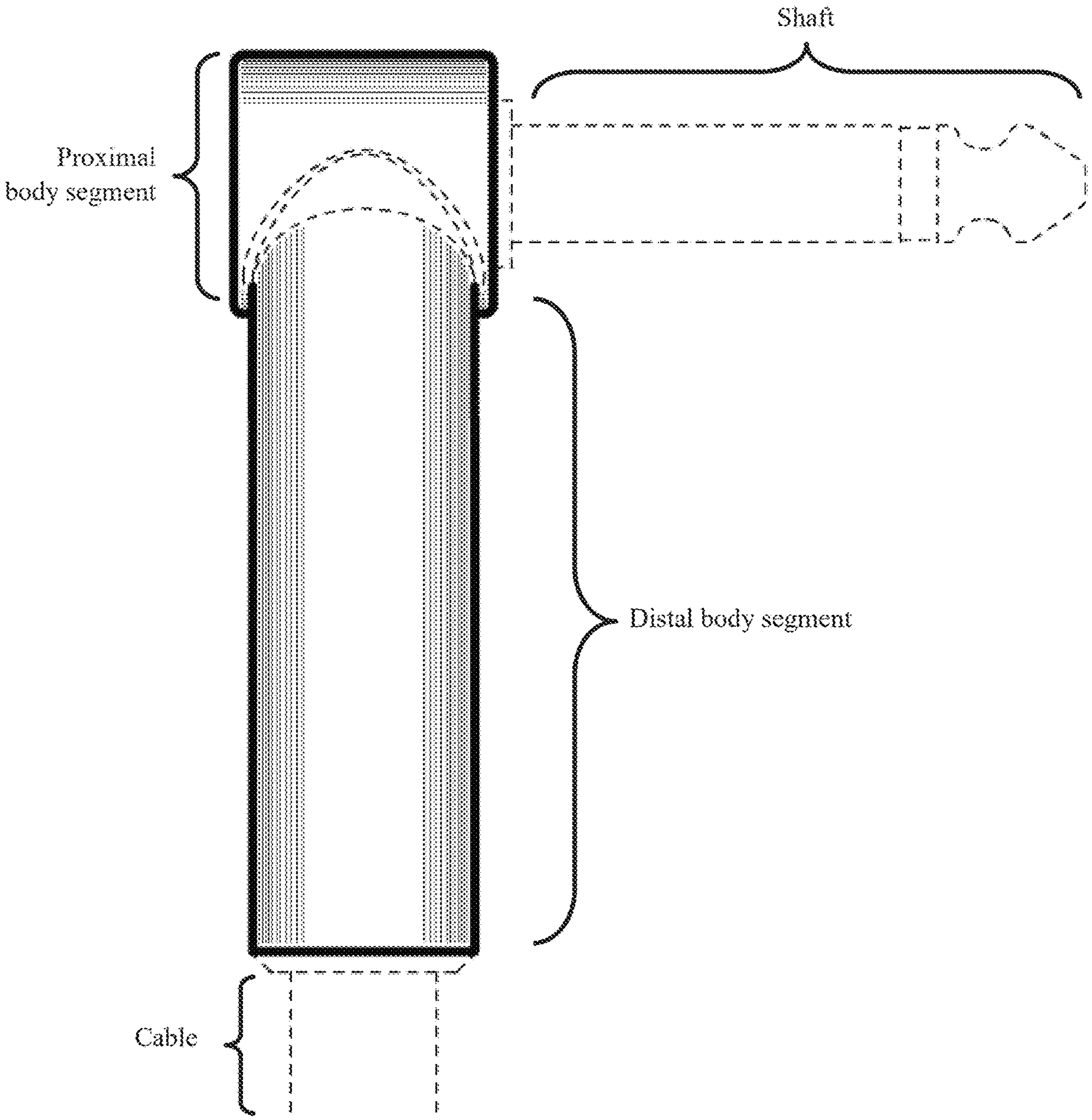
FIG. 10 is a left-side view thereof.
Figure 11:
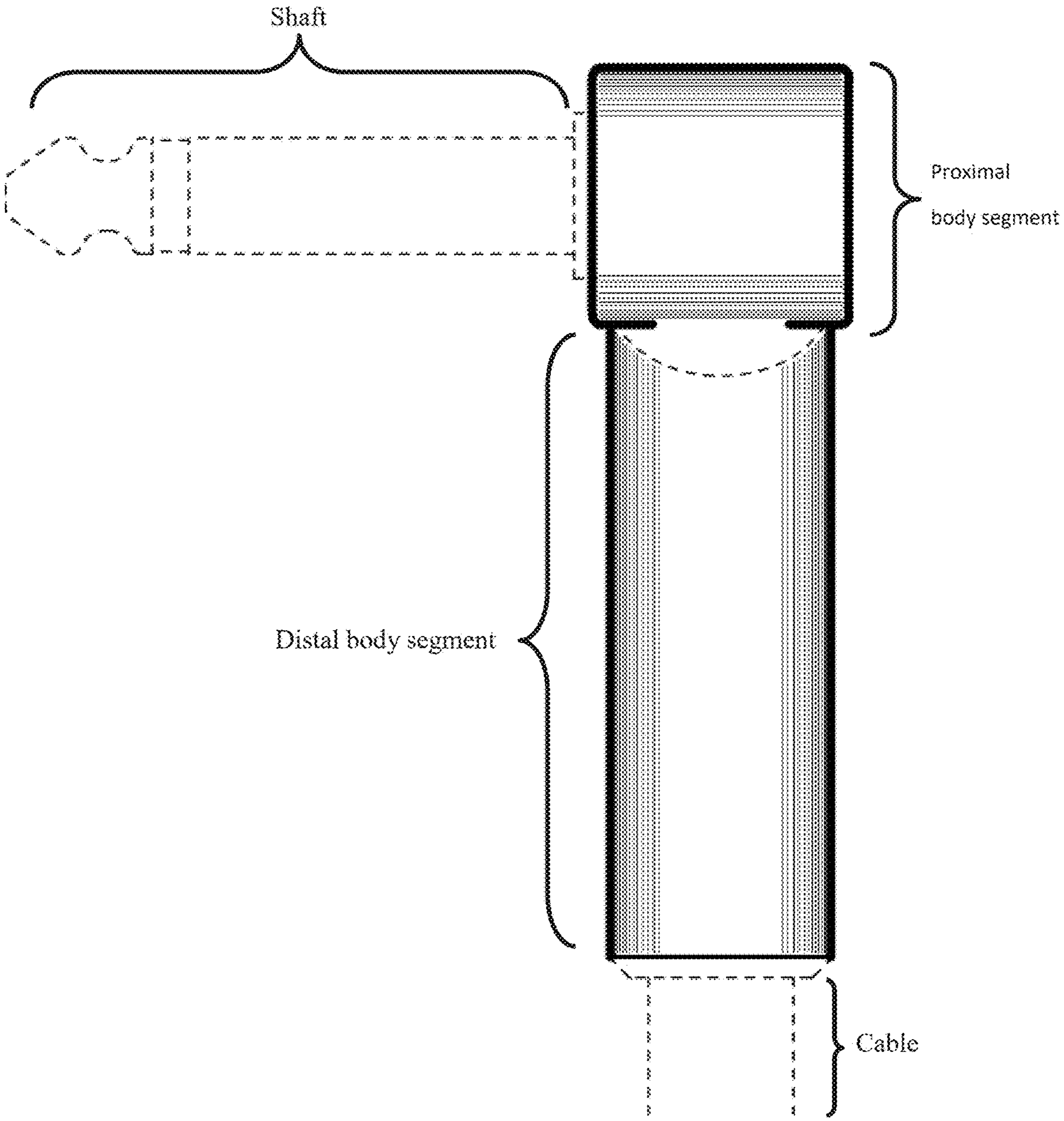
FIG. 11 is a right-side view thereof.
Figure 12:
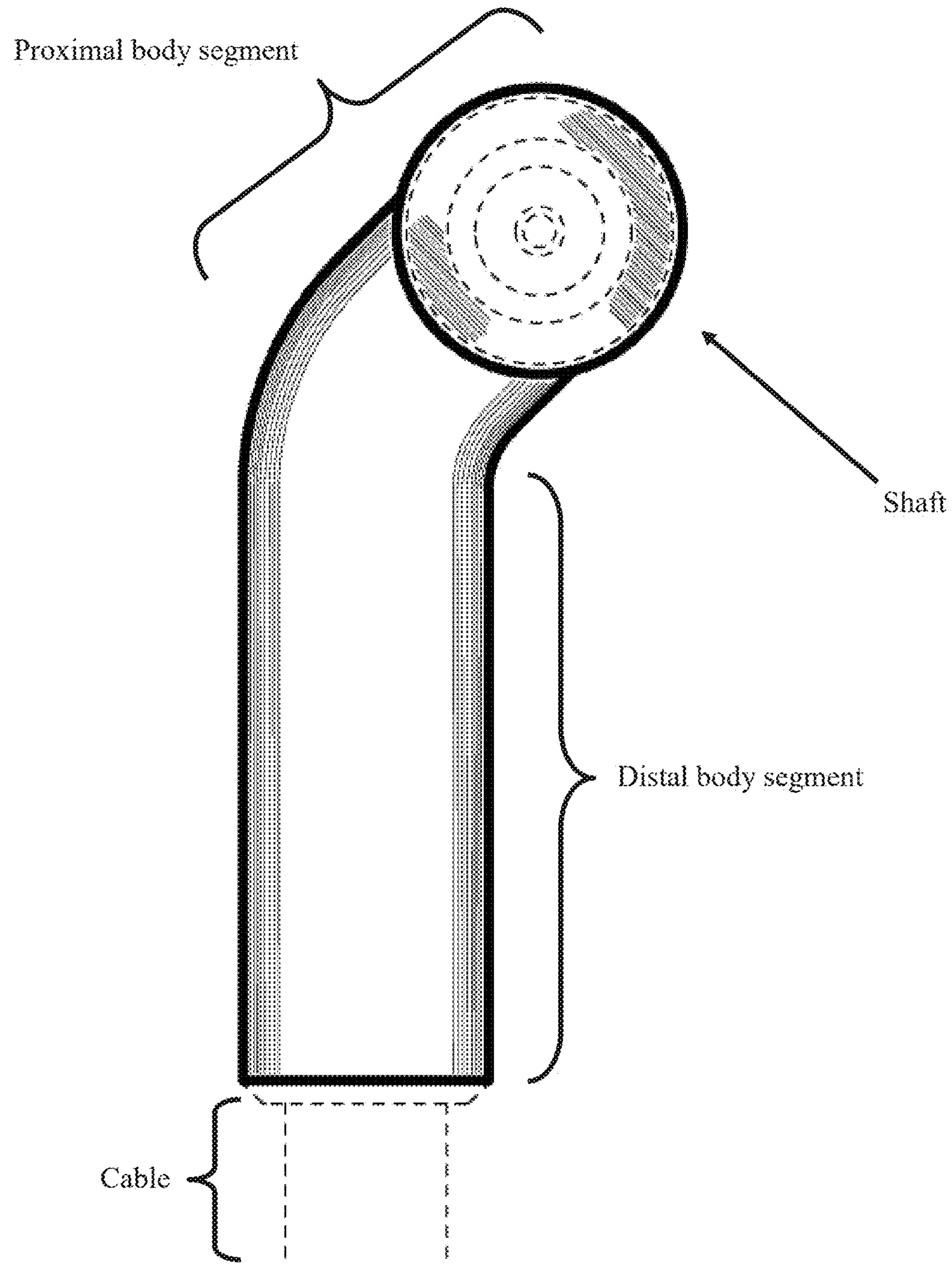
FIG. 12 is a front view thereof.
Figure 13:
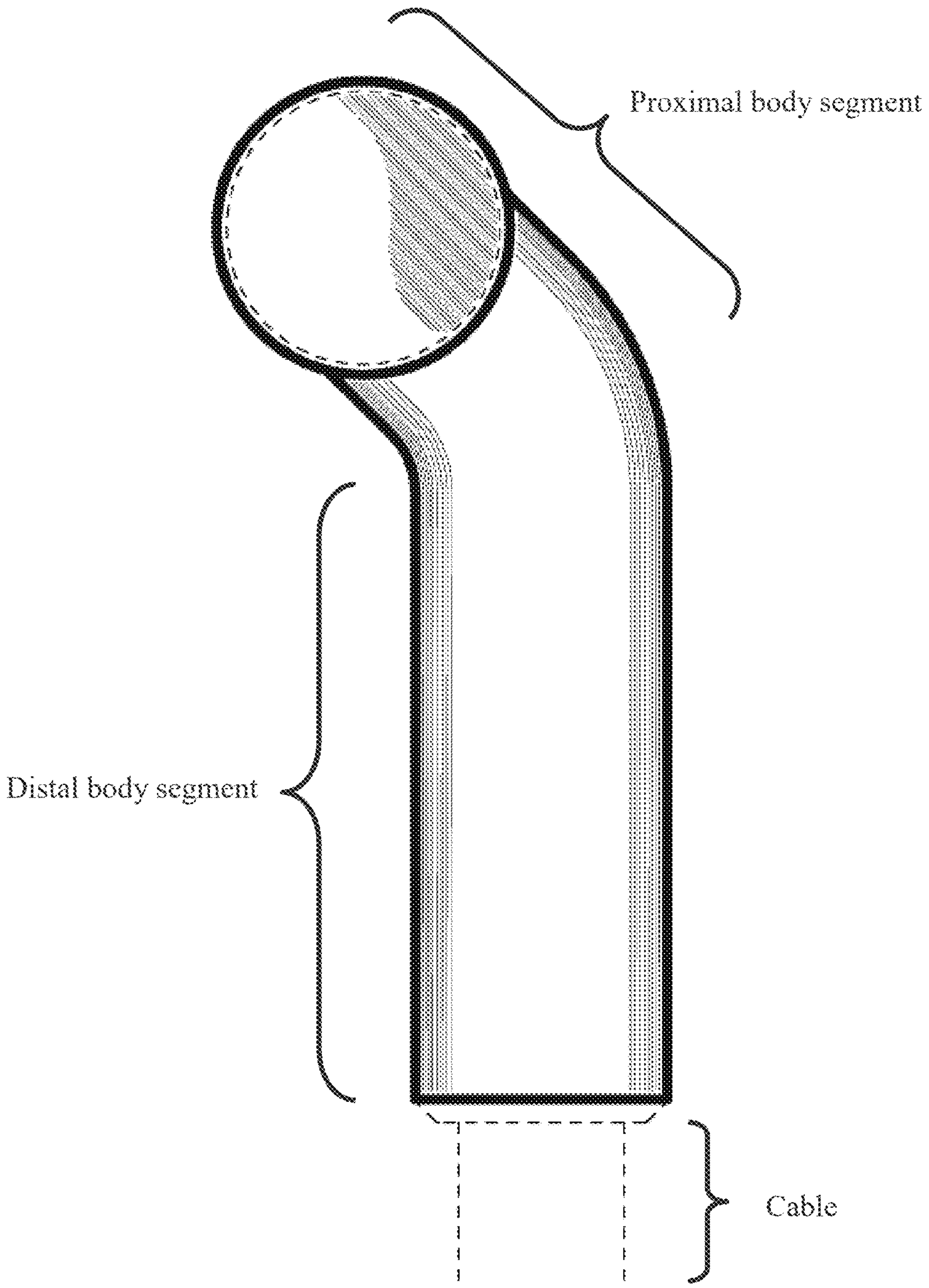
FIG. 13 is a rear view thereof.
Figure 14:
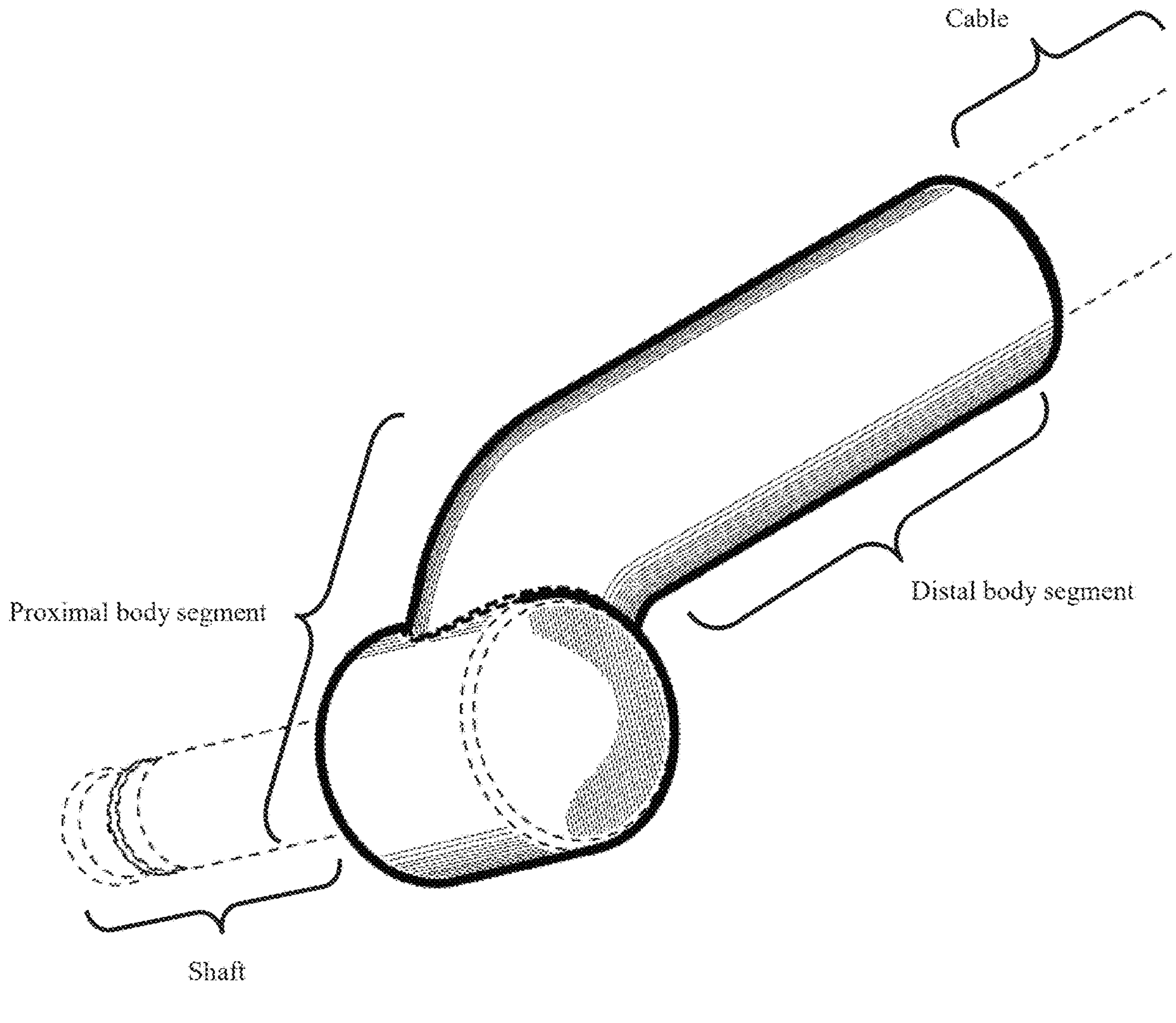
FIG. 14 is a perspective view thereof.
Figure 15:
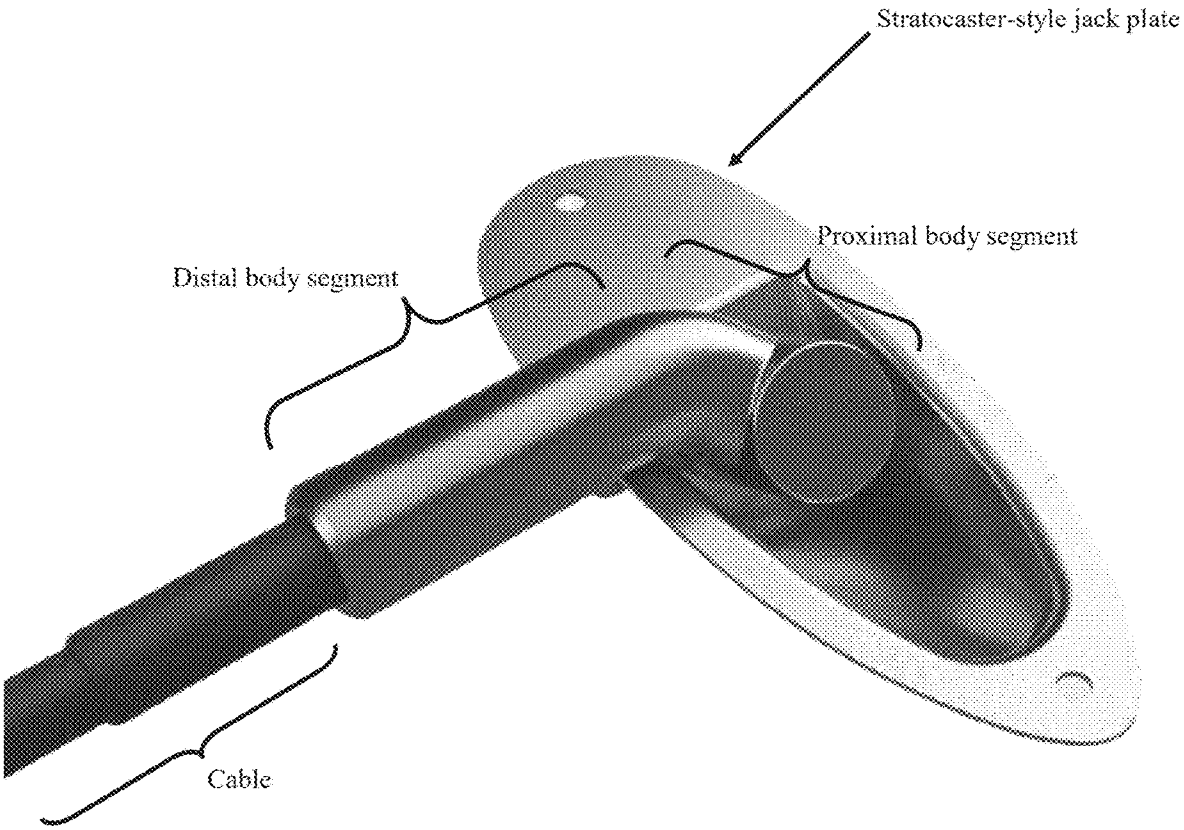
FIG. 15 shows the plug inserted into a Fender Stratocaster-style input jack plate from a front-perspective view.
Figure 16:
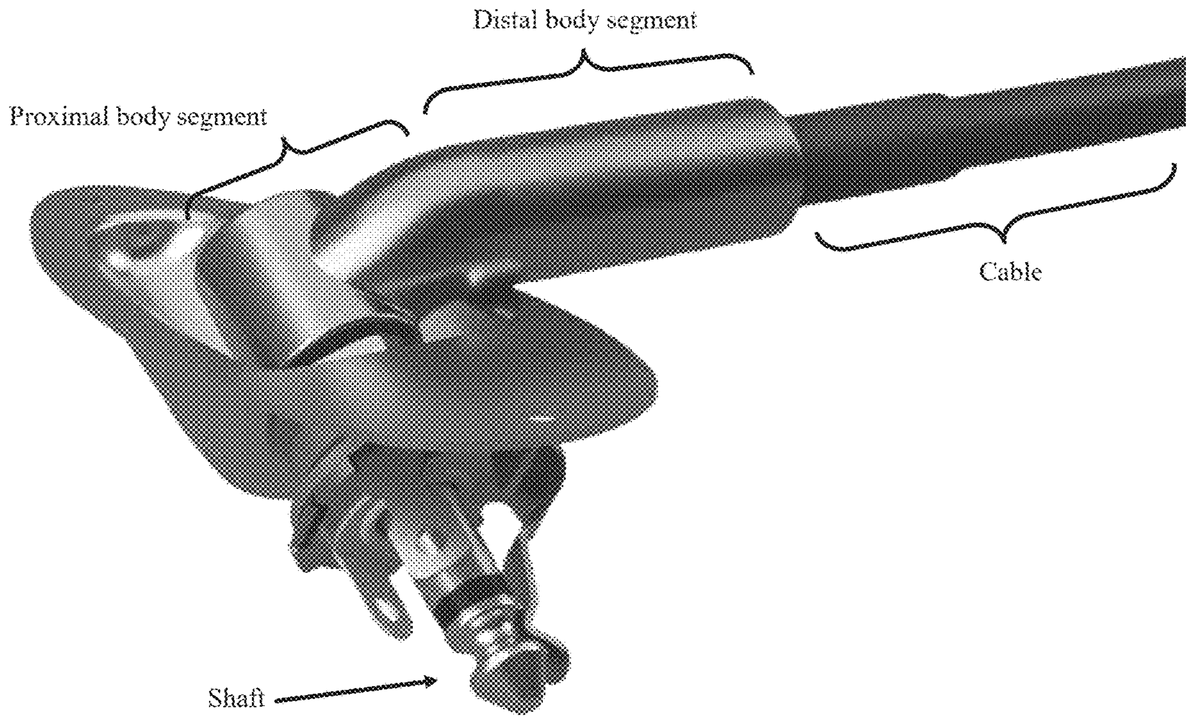
FIG. 16 shows the same from a rear-perspective view.
Figure 17:
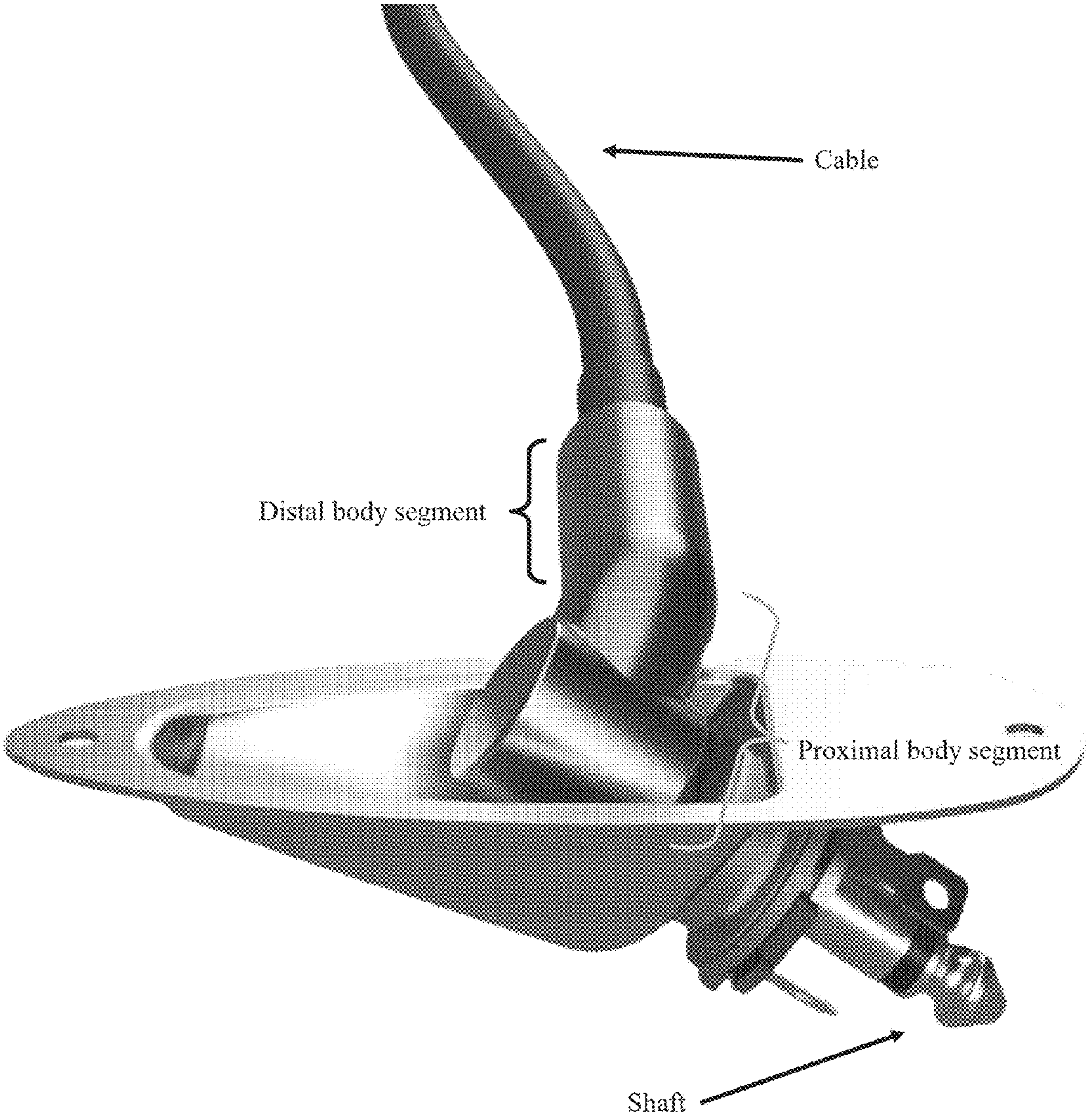
FIG. 17 shows the same from a side-perspective view.

This invention improves upon the prior art of one-dimensional straight and two-dimensional right-angle ¼-inch audio plugs by adding a new angle in the body of a right-angle plug. The body therefore divides into two segments, a proximal segment, which shares a right angle with the plug's shaft, and a distal segment, from which the cable protrudes. The proximal segment is therefore bounded by 1) the right angle connecting to the plug's shaft, and 2) the new angle connecting to the distal segment. And the distal segment is therefore bounded by 1) the new angle connecting to the proximal segment and 2) the plug's exit from which the cable protrudes.

The axes running through the plug's shaft and proximal segment create a two-dimensional geometric plane; let this plane be called the 'shaft-proximal plane.' The new angle A2 separating the proximal and distal segments creates the distal segment's axis, which departs from the shaft-proximal plane into a third dimension.

Let the angle connecting the shaft and the proximal segment be called the "right angle." Let the angle connecting the proximal and distal segments be called the "new angle" A2.

The new angle A2 should be less than 180 degrees, but preferably at least 90 degrees, and even more preferably approximately 135 degrees. The variability of the new angle's measurement is acceptable because the intended effect of the invention—to facilitate the laying-flat of the cable on a Strat-style guitar—can be accomplished with different angles, depending on the girth of the plug's body. For example, a plug with a thinner body can be rotated further around the axis of the plug's shaft before hitting the sides of the recessed output jack plate. Let a centerline be defined as being equidistant from both sides of the jack plate. The further the body rotates from the centerline, the larger the new angle A2 must be to keep the distal segment parallel to the surface of the guitar. In contrast, a plug with a thicker body has a more limited range of rotation. The closer the body stays to the centerline, the smaller the new angle A2 must be to keep the distal segment parallel to the surface of the guitar. In the drawings accompanying this application, the new angle A2 measures 135 degrees.

To use this invention, there are only three steps:

1. Acquire a guitar with a Strat-style, angle-recessed output jack
2. Pull the instrument-end of the cable through the strap gap from back to front 3. Insert the plug into the guitar's output jack The design of the plug intuitively suggests how properly to use it once confronted with the step 220 of inserting the plug into the guitar's output jack. It is so intuitive, even, that if one skipped the step of pulling the cable through the guitar strap gap (but knew that some guitarists do route their cables through their straps), upon inserting the plug into the output jack, it would likely occur to the guitarist that he should pull the cable through the strap.

Guitars are manufactured in both right- and left-handed orientations. The orientation of the instrument determines to which side of the output jack the cable must be led by the plug's body to be routed through the player's strap gap. From the perspective of a right-handed guitarist, the strap is to the right of the output jack. From the perspective of a left-handed guitarist, the strap is to the left of the output jack. Therefore, the new angle for a right-handed plug must 'bend' to the right and the new angle for the left-handed plug must bend to the left. Both the left- and right-handed orientations of the plug are therefore claimed in this invention.

The invention claimed is:

1. An audio plug comprising:

a shaft with a ¼-inch diameter; and a body having a proximal segment and a distal segment, wherein the proximal segment is coupled to an end of the shaft and oriented at a first angle of 90 degrees relative to the shaft in a two-dimensional shaft-proximal plane, wherein the distal segment is arranged at a second angle to the proximal segment such that the distal segment extends from the shaft-proximal plane into a third dimension, wherein the second angle demarcating the proximal and distal segments of the body ranges from at least 90 degrees to 180 degrees, wherein the body is configured to house electrical connections between a cable received through an exit in the distal segment and electrical contacts of the shaft.

2. The audio plug of claim 1, wherein the body is cylindrical.

3. The audio plug of claim 1, wherein the second angle is 135 degrees.

4. The audio plug of claim 1, wherein the shaft-proximal plane has a first side and a second side opposite the first side, and wherein the second angle is arranged to extend the distal segment from the first side of the shaft-proximal plane into the third dimension thereby resulting in a right-handed orientation of the audio plug.

5. The audio plug of claim 1, wherein the shaft-proximal plane has a first side and a second side opposite the first side, and wherein the second angle is arranged to extend the distal segment from the second side of the shaft-proximal plane into the third dimension thereby resulting in a left-handed orientation of the audio plug.

6. The audio plug of claim 1, wherein when the audio plug is inserted into an output jack plate in a surface of a strat-style guitar, the audio plug is configured to be rotated around an axis of the shaft until the cable received through the exit of the distal segment of the audio plug is arranged parallel to the surface of the strat-style guitar by virtue of the second angle between the proximal and distal segments of the body.

* * * * *